United States Patent
Shoen

(10) Patent No.: US 7,428,336 B2
(45) Date of Patent: Sep. 23, 2008

(54) EFFICIENT DETECTION OF CONSTANT REGIONS OF AN IMAGE

(75) Inventor: Jay R. Shoen, Boise, ID (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 11/368,656

(22) Filed: Mar. 6, 2006

(65) Prior Publication Data

US 2007/0206861 A1    Sep. 6, 2007

(51) Int. Cl.
*G06K 9/46* (2006.01)
(52) U.S. Cl. ................ 382/195; 358/448; 382/201; 382/216
(58) Field of Classification Search ........... 382/190, 382/195, 199, 205, 100, 144, 145, 146, 147, 382/181, 192, 193, 194, 201, 206, 209, 216, 382/217, 221, 225, 260–266; 358/426.01–42
See application file for complete search history.

(56) References Cited

U.S. PATENT DOCUMENTS

| | | | | |
|---|---|---|---|---|
| 4,703,513 A * | 10/1987 | Gennery | ............... | 382/308 |
| 4,833,722 A * | 5/1989 | Morton et al. | ............... | 382/199 |
| 5,077,805 A * | 12/1991 | Tan | ............... | 382/137 |
| 5,487,116 A * | 1/1996 | Nakano et al. | ............... | 382/104 |
| 5,698,833 A * | 12/1997 | Skinger | ............... | 235/462.09 |
| 6,565,003 B1 * | 5/2003 | Ma | ............... | 235/462.1 |
| 6,591,010 B1 * | 7/2003 | Russin | ............... | 382/209 |

\* cited by examiner

*Primary Examiner*—Anand Bhatnagar

(57) ABSTRACT

A technique that improves image analysis efficiency by reducing the number of computations needed to detect constant regions. Constant region detection according to the present techniques includes determining whether an image analysis window at a current position contains a constant region by analyzing a new line of pixels in the image analysis window if a pixel at a predetermined location in the image analysis window in the current position has a value equal to a pixel at the predetermined location from a previous position of the image analysis window. Analyzing only the new line of pixels saves the computational time that would otherwise go into analyzing all of the pixels in the image analysis window.

17 Claims, 3 Drawing Sheets

```
┌─────────────────────────────────┐
│   Shift the Image Analysis Window│
│   to Include a New Line of Pixels│
│              100                 │
└─────────────────────────────────┘
                │
                ▼
┌─────────────────────────────────────────┐
│ Determine Whether the Pixel at the Center│
│ of the Image Analysis Window at its Current│
│ Position Equals the Pixel at the Center of the│
│ Image Analysis Window at its Previous Position│
│                   102                    │
└─────────────────────────────────────────┘
         Yes  │          │  No
              ▼          ▼
┌──────────────────┐  ┌──────────────────┐
│ Analyze the New  │  │ Analyze all of the│
│ Line of Pixels   │  │ Pixels in the Image│
│      204         │  │ Analysis Window  │
│                  │  │      206         │
└──────────────────┘  └──────────────────┘
```

FIG. 4

EFFICIENT DETECTION OF CONSTANT REGIONS OF AN IMAGE

BACKGROUND

A variety of devices may perform image analysis. For example, a computer system may analyze an image to detect features of interest in the image before sending the image to a printer. Similarly, a printer may analyze an image to detect features of interest in the image before printing the image. An example of a feature of interest in an image is a boundary between objects contained in the image.

An image undergoing analysis may be represented as a two-dimensional array of pixels each having a value. An image represented as a two-dimensional array of pixels may be referred to as an image frame. An image frame may be analyzed using an image analysis window that encompasses a portion of the image frame. An image analysis window may be used to divide image analysis into successive analyses of relatively small areas of an image frame.

An analysis of an image frame may include determining whether an image analysis window contains a constant region. A constant region may be defined as a region in which all of the pixels have substantially similar values according to an analysis metric, e.g. the values are substantially similar within a predetermined tolerance. A detection of a constant region may be used, for example, to rule out the constant region as containing features of interest Prior methods for determining whether an image analysis window contains a constant region may include analyzing all of the pixels contained in the image analysis window. Unfortunately, analyzing all of the pixels contained in an image analysis window as the image analysis window is scanned over an image frame may be computationally intensive. For example, a 3 pixel by 3 pixel image analysis window applied to a 512 pixel wide image frame would include analyzing 9 pixels 512 times in just one 3 pixel high swath across the image frame. Large numbers of computations in detecting constant regions of an image frame slows the process of image analysis and may increase the cost of image analysis.

SUMMARY OF THE INVENTION

A technique is disclosed that improves image analysis efficiency by reducing the number of computations needed to detect constant regions. Constant region detection according to the present techniques includes determining whether an image analysis window at a current position contains a constant region by analyzing a new line of pixels in the image analysis window if a pixel at a predetermined location in the image analysis window in the current position has a value equal to a pixel at the predetermined location from a previous position of the image analysis window. Analyzing only the new line of pixels saves the computational time that would otherwise go into analyzing all of the pixels in the image analysis window.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIGS. 3a-3b illustrate an example of constant region detection according to the present teachings;

FIG. 4 shows a method for efficient detection of a constant region of an image according to the present teachings.

DETAILED DESCRIPTION

Figure 1:
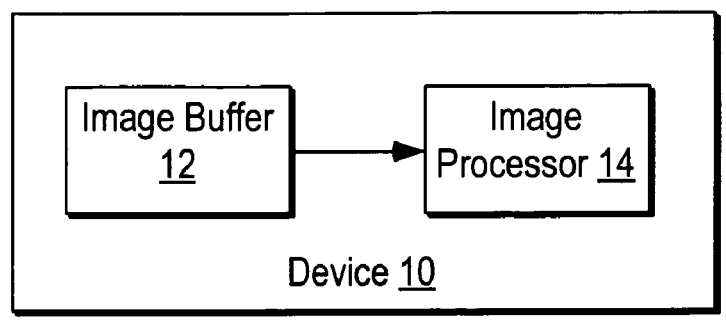
FIG. 1 shows a device that performs image analysis according to the present teachings.

FIG. 1 shows a device 10 that performs image analysis according to the present teachings. The device 10 includes an image buffer 12 and an image processor 14. The image processor 14 accesses image frames stored in the image buffer 12 and analyzes the image frames including detecting constant regions of the image frames.

Figure 2:
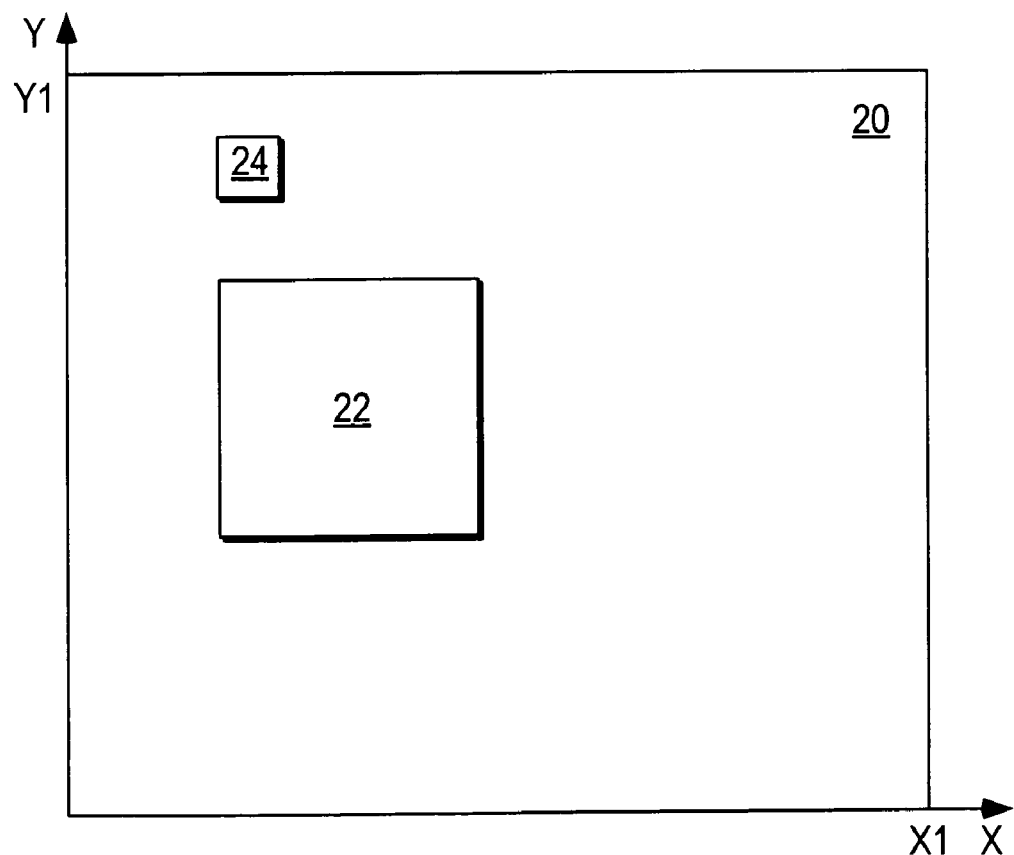
FIG. 2 illustrates an image frame stored in an image buffer and an image analysis window used to analyze the image frame.

FIG. 2 illustrates an image frame 20 stored in the image buffer 12. The image frame 20 includes a two-dimensional array of pixels. The array has a width of x1 pixels and a height of y1 pixels with respect to a set of x-y axes.

The image frame 20 includes an object 22. In this example, the values of the pixels in the object 22 are substantially similar, i.e. the object 22 has a substantially uniform color and intensity. In addition, the values of the pixels in the image frame 20 that are outside of the object 22 are substantially different from the pixels of the object 22.

The image processor 14 analyzes the image frame 20 using an image analysis window 24. The image analysis window 24 is relatively small in comparison to the image frame 20. For example, the image analysis window 24 may be 3 pixels by 3 pixels, or 5 pixels by 5 pixels, or 7 pixels by 7 pixels, etc., while the image frame 20 may be 800 pixels by 600 pixels, or 1024 pixels by 768 pixels, etc.

Figures 3A, 3B:
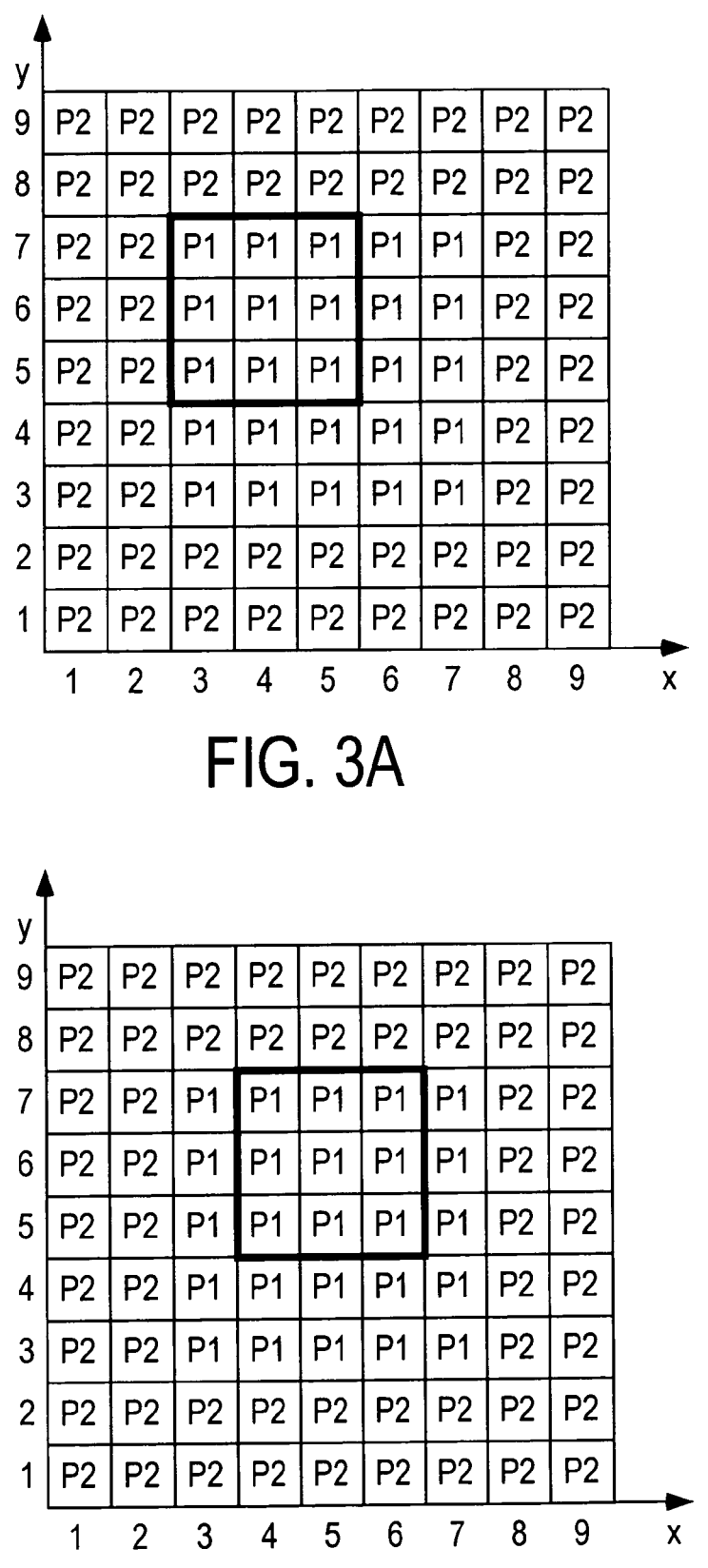

The image processor 14 analyzes the image frame 20 by scanning the image frame 20 using the image analysis window 24, which is defined by a rectangular or square boundary as shown in FIGS. 2 and 3A-B. In one embodiment, the image processor 14 scans the image frame 20 from top-left to bottom-right. For example, the image processor 14 may place the image analysis window 24 so that it overlaps the top left pixels of the image frame 20 and then shift the image analysis window 24 to the right one pixel at a time until the line of pixels at x=x1 is reached. The image processor 14 may then move the image analysis window 24 down by the height of the image analysis window 24 and to the left to x=1 and then scan across as before, etc.

Each time that the image processor 14 shifts the image analysis window 24 to include a new line of pixels of the image frame 20 it determines whether the image analysis window 24 at its current position contains a constant region of the image frame 20. If the image analysis window 24 at its previous position did not contain a constant region then the image processor 14 determines whether the image analysis window 24 at its current position contains a constant region by analyzing all of the pixels in the image analysis window 24 at its current position, e.g. using known techniques.

On the other hand, if the image analysis window 24 at its previous position did contain a constant region then the image processor 14 determines whether the image analysis window 24 at its current position contains a constant region using the following analysis that enables a reduction in computational load on the image processor 14. The image processor 14 detects a constant region by analyzing only the new line of pixels at the current position of the image analysis window 24 if a pixel at a predetermined location in the image analysis window 24 as determined relative to the boundary of the window 24 at its current position has a value equal to a value of a pixel in the predetermined location in the image analysis window 24 as determined relative to the boundary of the window 24 at its previous position. Only the pixels in the new line need to be analyzed under this condition because all of the other pixels in the image analysis window 24 in its current position are already known to be constant with respect to the pixel at the predetermined location because the image analysis window 24 at its previous position contained a constant region. The new line of pixels may be analyzed by comparing the values in the new line to the value at the predetermined location. If the value of the pixel at the predetermined location in the image analysis window 24 in its current position does not equal the value of the pixel at the predetermined location in the image analysis window 24 at its previous position then the image processor 14 analyzes all of the pixels in the image analysis window 24 to detect a constant region. In one embodiment, the predetermined location is a center pixel of the image analysis window 24.

FIGS. 3a-3b illustrate an example of constant region detection according to the present teachings. The image frame 20 in this example includes an array of pixels P(1,1) through P(9,9). The object 22 in this example is a square region with corner pixels at P(3,3), P(7,3), P(3,7), and P(7,7). The pixels of the object 22 all have values equal to P1 and the pixels outside of the object 22 all have values equal to P2.

FIG. 3a shows the image analysis window 24 as a 3 by 3 window at a position that includes the pixels P(3,5), P(3,6), P(3,7), P(4,5), P(4,6), P(4,7), P(5,5), P(5,6), and P(5,7). The image analysis window 24 at its previous position did not contain a constant region because it included the line of pixels P(2,5), P(2,6), and P(2,7) each having the value P2 and the pixels P(3,5), P(3,6), P(3,7), P(4,5), P(4,6), and P(4,7) each having the value P1. As a consequence, the image processor 14 determines whether the image analysis window 24 contains a constant region by analyzing all of the pixels P(3,5), P(3,6), P(3,7), P(4,5), P(4,6), P(4,7), P(5,5), P(5,6), and P(5,7). The image processor 14 records the value of the pixel at the center of the analysis window 24, i.e. the value P1 of pixel P(4,6).

FIG. 3b shows the image analysis window 24 shifted to the right to include a new line of pixels P(6,5), P(6,6), and P(6,7). The image analysis window 24 at its previous position did contain a constant region so the image processor 14 determines whether the image analysis window 24 at its current position contains a constant region by analyzing only the new line of pixels if the pixel at the center of the image analysis window 24 at its current position, i.e. the pixel P(5,6), has a value equal to the pixel at the center of the previous position of the image analysis window 24, i.e. the pixel P(4,6). Given that the value of pixel P(5,6) equals the value of the pixel P(4,6) of P1, the image processor 14 detects a constant region in the current position of the image analysis window by analyzing only the pixels P(6,5), P(6,6), and P(6,7). Thus, the computational time that would otherwise be involved in analyzing the remaining pixels P(4,5), P(4,6), P(4,7), P(5,5), P(5,6), and P(5,7) in the image analysis window 24 in its current position is saved.

FIG. 4 shows a method for efficient detection of a constant region of an image according to the present teachings. At step 100, an image analysis window is shifted to a current position that includes a new line of pixels from an image frame. At step 102, it is determined whether a pixel at the center (or some other predetermined location) of the image analysis window in the current position has a value that equals a pixel at the center (or some other predetermined location) of the image analysis window at the previous position of the image analysis window. If the answer is yes then step 104 is performed. Otherwise, step 106 is performed.

At step 104, a constant region is detected by analyzing the new line of pixels. The new line of pixels may be analyzed using known techniques, e.g. by determining whether the values of the new line of pixels are within a predetermined tolerance.

At step 106, a constant region is detected by analyzing all of the pixels in the image analysis window at its current position. The pixels may be analyzed using known techniques, e.g. by determining whether the values of the pixels are within a predetermined tolerance.

The present techniques may be implemented in a wide variety of devices including computer systems, computing device, printers or other image generating devices, handheld and portable devices, etc. In addition, the present techniques may be implemented in a variety of image processing systems including image processing performed in software on computer systems as well as application-specific image processing systems.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for detecting a constant region of an image frame, comprising:
    shifting an image analysis window to a current position so that the image analysis window includes a new line of pixels from the image frame in comparison to a previous position of the image analysis window, wherein an entire area of the image analysis window at the previous position is a first constant region of pixels and wherein a constant region is defined as a region wherein all pixels contained therein are substantially similar in value;
    determining whether the entire area of the image analysis window at the current position is a second constant region by analyzing a first pixel at a predetermined location in the image analysis window at the current position, the predetermined location being defined relative to a boundary of the image analysis window, wherein the analyzing comprises:
        determining if the first pixel has a value equal to a value of a second pixel at the predetermined location relative to the boundary of the image analysis window when the image analysis window was at the previous position,
        if the value of the first pixel has a value equal to the value of the second pixel, then analyzing only the new line of pixels to determine if the second constant region is present.

2. The method of claim 1, wherein the predetermined location is a center of the image analysis window relative to the boundary of the image analysis window.

3. The method of claim 1, further comprising detecting the first constant region at the previous position of the image analysis window.

4. The method of claim 1, wherein analyzing the new line of pixels comprises comparing a set of values of the new line of pixels to a value of the second pixel at the predetermined location when the image analysis window was at the previous position.

5. The method of claim 1, wherein shifting the image analysis window comprises shifting the image analysis window by one pixel.

6. The method of claim 1, further comprising analyzing all of the pixels in the image analysis window when the value of the first pixel at the predetermined location does not equal the value of the second pixel at the predetermined location.

7. An image processing system comprising:
   means for holding an image frame; and
   means for 1) determining that an entire area of an image analysis window that included a plurality of pixels of the image frame at a previous position is a first constant region of pixels and wherein a constant region is defined as a region wherein all pixels contained therein are substantially similar in value and 2) detecting whether an entire area of the image analysis window at a current position is a second constant region of the image frame by analyzing a first pixel at a predetermined location in the image analysis window at the current position, predetermined location being defined relative to a boundary of the image analysis window, wherein the analyzing comprises:
      determining whether the first pixel has a value equal to a value of a second pixel at the predetermined location in the image analysis window relative to the boundary of the image analysis window when the image analysis window was at the previous position;
      if the value of the first pixel has a value equal to the value of the second pixel, then analyzing only a new line of pixels present in the image analysis window at the current position when compared with the image analysis window at the previous position to determine if the second constant region is present.

8. The image processing system of claim 7, wherein the predetermined location is a center of the image analysis window relative to the boundary of the image analysis window.

9. The image processing system of claim 7, wherein the means for detecting analyzes all of the pixels in the image analysis window when the value of the first pixel at the predetermined location does not equal the value of the second pixel at the predetermined location.

10. The image processing system of claim 9, wherein the means for detecting determines the second constant region to be present whenever the value of the first pixel at the predetermined location equals the value of the second pixel at the predetermined location.

11. The image processing system of claim 7, wherein the means for detecting determines the constant region to be present whenever the value of the first pixel at the predetermined location equals the value of the second pixel at the predetermined location.

12. A device, comprising:
   an image buffer that holds an image frame; and
   an image processor that detects a current constant region of the image frame by shifting an image analysis window to a current position so that the image analysis window includes a new line of pixels from the image frame in comparison to a previous position of the image analysis window, wherein an entire area of the image analysis window at the previous position is a previous constant region of pixels and wherein a constant region is defined as a region wherein all pixels contained therein are substantially similar in value; and the image processor determines whether an entire area of the image analysis window at the current position is the current constant region by analyzing a first pixel at a predetermined location in the image analysis window, wherein the analyzing comprises:
      determining if the first pixel has a value equal to a value of a second pixel at the predetermined location defined relative to the boundary of the image analysis window when the image analysis window was at the previous position,
      if the value of the first pixel has a value equal to the value of the second pixel, then analyzing only the new line of pixels to determine if the current constant region is present.

13. The device of claim 12, wherein the predetermined location is a center of the image analysis window relative to the boundary of the image analysis window.

14. The device of claim 12, wherein the image processor detects the previous constant region at the previous position of the image analysis window.

15. The device of claim 12, wherein the image processor analyzes the new line of pixels by comparing a set of values of the new line of pixels to a value of the second pixel at the predetermined location when the image analysis window was at the previous position.

16. The device of claim 12, wherein the image processor shifts the image analysis window by shifting the image analysis window by one pixel.

17. The device of claim 12, wherein the image analyzer analyzes all of the pixels in the image analysis window when the value of the first pixel at the predetermined location does not equal the value of the second pixel at the predetermined location.

* * * * *